(12) United States Patent
Balducci et al.

(10) Patent No.: US 7,078,466 B2
(45) Date of Patent: Jul. 18, 2006

(54) PROCESS FOR THE PREPARATION OF BRANCHED POLYDIENES IN THE PRESENCE OF CATALYSTS BASED ON RARE-EARTH

(75) Inventors: Alessandro Balducci, Ravenna (IT); Sandra Righi, Ravenna (IT)

(73) Assignee: Polimeri Europa S.p.A., Brindisi (IT)

( * ) Notice: Subject to any disclaimer, the term of this patent is extended or adjusted under 35 U.S.C. 154(b) by 228 days.

(21) Appl. No.: 10/736,744

(22) Filed: Dec. 17, 2003

(65) Prior Publication Data

US 2004/0127665 A1    Jul. 1, 2004

(30) Foreign Application Priority Data

Dec. 20, 2002   (IT)  ............................. MI2002A2711

(51) Int. Cl.
*C08F 4/52* (2006.01)
(52) U.S. Cl. .................... 526/73; 526/153; 526/164
(58) Field of Classification Search ................ 526/153, 526/164, 73
See application file for complete search history.

(56) References Cited

U.S. PATENT DOCUMENTS

| 6,391,990 B1 * | 5/2002 | Ishino et al. ................ 526/143 |
| 2002/0016423 A1 | 2/2002 | Jang et al. |

FOREIGN PATENT DOCUMENTS

| EP | 0 863 165 A1 | 9/1998 |
| EP | 1 054 026 A1 | 11/2000 |
| WO | WO 00/69928 | 11/2000 |

* cited by examiner

*Primary Examiner*—Fred Teskin
(74) *Attorney, Agent, or Firm*—Oblon, Spivak, McClelland, Maier & Neustadt, P.C.

(57) ABSTRACT

A process is described for the preparation of polydienes with a low vinyl content and having a branched structure effected by means of the polymerization of conjugated dienes in the presence of catalysts based on rare-earth compounds. The resulting polymers are characterized in that they have a cis content varying from 80 to 96% and prove to be branched with consequent low viscosity values in solution.

10 Claims, No Drawings

PROCESS FOR THE PREPARATION OF BRANCHED POLYDIENES IN THE PRESENCE OF CATALYSTS BASED ON RARE-EARTH

The present invention relates to a process for the preparation of branched polydienes, more specifically branched polybutadiene, effected in the presence of catalysts based on rare-earth, preferably based on neodymium.

There are numerous examples in the known art of catalytic systems with two or more components based on rare-earth for promoting the polymerization of conjugated dienes to give polydienes having a high cis content. For example DE 1812935, DE 2011543, DE 2833721, WO 93/05083 describe the preparation of polybutadiene having a high cis content using a catalytic system consisting of rare-earth compounds and aluminum alkyls.

More specifically, WO 93/05083 describes the preparation of 1,4 cis polybutadiene using a four-component catalyst consisting of: (a) a rare-earth compound, (b) an aluminum alkyl, (c) a conjugated diene, (d) a halogenated compound.

EP 0919573 discloses the preparation and use of rare-earth allyl compounds in the polymerization of conjugated dienes to give polydienes with a high cis content. In this patent, the best results are obtained using aluminoxanes, preferably MAO, as cocatalysts.

With the catalytic systems so far described, however, polymers are obtained with a linear structure and consequently characterized by high viscosity values in solution and a poor processability. Polymers having lower viscosities in solution and/or an improved processability can be obtained by subjecting the polymeric solution to a post-treating process, as described in U.S. Pat. No. 5,567,784. At the end of the post-treatment a polymer is obtained, characterized by a significant branching index (measured with GPC-MALLS analysis) which demonstrates that the cross-linking reaction has taken place.

Patents EP 0863165 and EP 1026181 describe the production in batch and in continuous of polydienes obtained using catalysts consisting of rare-earth compounds and consisting of (a) a lanthanide compound, (b) an aluminoxane, (c) at least one halogenated organometallic compound. As the resulting polymers are linear and therefore characterized by high viscosity values in solution which do not allow their use in the modification of plastic materials (i.e. high impact polystyrene), the same patents disclose how an improvement in the processability of the polymers produced can be obtained by reaction of the unquenched polymer with at least one compound selected from a halogenated organic compound, an organometallic compound, a halogenated isocyanate, a carboxylic acid, etc.

EP 1099711 also describes an improvement in the processability by means of a method which consists in post-treating the unquenched polymeric solution with at least one compound selected from a quinone compound, a thiazole compound, a dithiocarbamate, a thiouramic compound, etc.

A process has now been found for the polymerization of conjugated dienes, both batchwise and in continuous, to give gel-free polymers, having a polydispersity varying from 2.0 to 4.5, branching index values (measured with GPC-MALLS analysis) lower than 0.90, using catalysts based on lanthanide compounds and without effecting any further post-modification treatment on the polymeric solution.

Furthermore, the above polydienes, with the same molecular weight, have much lower viscosities in solution, with respect to the corresponding polydienes having a linear structure.

In accordance with this, the present invention relates to a process for the preparation of polydienes which comprises the polymerization of conjugated dienes in the presence of a catalytic system which essentially consists in components (a) to (d), wherein:

component (a): compound containing a rare-earth element having an atomic number from 57 to 71 in the Periodic Table, or a product obtained by reacting the above compound with a Lewis base;

component (b): an organo aluminum derivative containing at least one halogen atom;

component (c): alumoxane;

component (d): an organometallic compound of aluminum represented by general formula (I) $AlR_1R_2R_3$ wherein $R_1$ and $R_2$, the same or different, are hydrocarbyl groups having from 1 to 10 carbon atoms or hydrogen, and $R_3$ is a hydrocarbyl group having from 1 to 10 carbon atoms; the above process being characterized in that it is effected under operating conditions selected from:

(i) essentially isothermal conditions at a temperature ranging from 70° C. to 140° C., preferably from 80° C. to 120° C.;

(ii) essentially adiabatic conditions with an initial temperature ranging from 50° C. to 90° C. and a final temperature ranging from 100° C. to 150° C.;

the above process being continued under conditions (i) or (ii) until a polydiene is obtained, having branching index values (measured with the GPC-MALLS technique) lower than 0.90 and α parameter values (also measured with the GPC-MALLS technique) ranging from 0.53 to 0.30.

Component (a) used in the process of the present invention is a compound containing a rare-earth element having an atomic number from 57 to 71 in the periodic table or a compound obtained by the reaction of the above compound with a Lewis base. As far as the rare-earth element is concerned, this is preferably selected from neodymium, praseodymium, cerium, lanthanum, gadolinium and the relative mixtures. In the preferred embodiment, it is neodymium.

Component (a) containing the rare-earth element is selected from carboxylates, alkoxides, complexes with β-diketones, phosphates, phosphites. Among these, carboxylates and phosphates are preferred, carboxylates are even more preferred. The rare-earth carboxylates are represented by the following general formula (II)

$$(R^{11}-COO)_3M \qquad (II)$$

wherein M is a rare-earth element having an atomic number from 57 to 71, $R^{11}$ is a hydrocarbon group having from 1 to 20 carbon atoms, preferably a saturated or unsaturated, linear, branched or cyclic alkyl group. Typical examples of carboxylic acids having the general $R^{11}$—COOH are octanoic acid, 2-ethyl-hexanoic acid, oleic acid, stearic acid, benzoic acid, naphthenic acid, versatic acid (trade-name of Shell Chemical Corporation, carboxylic acid in which the carboxylic group is bound to a tertiary carbon atom).

The rare-earth alkoxides have general formula (III)

$$(R^{12}O)_3M$$

wherein M has the meaning defined above. As an example of the alkoxide group represented by $R^{12}O$, the 2-ethylhexylalkoxy group, oleylalkoxy group, stearylalkoxy group, phenoxy group, benzylalkoxy group, can be mentioned. Among these, 2-ethyl-hexylalkoxy and benzylalkoxy groups are preferred.

With respect to the β-diketone complexes with rare-earth, complexes with acetylacetone, benzoylacetone, propionitrile, acetone, valerylacetone, ethylacetylacetone, can be mentioned. Among these complexes with acetylacetone and ethylacetylacetone are preferred.

As far as rare-earth phosphates and phosphites are concerned, phosphates and carboxylates of neodymium, particularly neodymium 2-ethylhexanoate and neodymium versatate, are preferred.

Lewis bases are used to dissolve the rare-earth element in the solvent selected, or for the stable and lengthy storage of the rare-earth. Lewis bases which can be used are acetylacetone, tetrahydrofuran, pyridine, N,N-dimethylformamide, thiophene, diphenylether, triethylamine, organo-phosphoric compounds, monovalent or bivalent alcohols.

With respect to component (b), this is an organo aluminum derivative containing at least one halogen atom, preferably bromine or chlorine, even more preferably chlorine. Typical examples of components (b) are: diethyl aluminum chloride, ethyl aluminum sesquichloride, ethyl aluminum dichloride, ethyl aluminum dibromide, ethyl aluminum sesquichloride.

Component (c) used in the process of the present invention is an aluminoxane having a chemical structure indicated by formula (IV)

$$R^{20}-Al-(O-Al)_n \quad\quad (IV)$$

wherein $R^{20}$ is a hydrocarbyl group having from 1 to 20 carbon atoms and n is an integer greater than or equal to 2.

In the aluminoxane represented by formula (IV), the hydrocarbyl group represented by $R^{20}$ comprises methyl, ethyl, propyl, n-butyl, isobutyl, t-butyl, hexyl, isohexyl, octyl and similar products. The $R^{20}$ group is preferably selected from methyl, ethyl, n-butyl, isobutyl, t-butyl; more preferably $R^{20}=CH_3$. In the preferred embodiment n is an integer $\geq 5$, even more preferably n ranges from 10 to 100.

The production of aluminoxanes can be effected according to well known techniques. For example, an aluminoxane can be produced by adding trialkylaluminum or dialkylaluminum monochloride to an organic solvent such as benzene, toluene, xylene, and by adding and reacting water or a salt having crystallization water such as copper sulfate pentahydrate, aluminum sulfate hexadecahydrate and the like.

Component (d) used in the process of the present invention has general formula (I) $AlR_1R_2R_3$ wherein $R_1$, $R_2$, $R_3$ have the meaning defined above. Typical examples of compounds having general formula (I) are trimethyl aluminum, triethyl aluminum, tri-n-propyl aluminum, tri-isopropyl aluminum, tri-n-butyl aluminum, tri-isobutyl aluminum, tri-t-butyl aluminum, tripentyl aluminum, trihexyl aluminum, tricyclohexyl aluminum, trioctyl aluminum, diethyl aluminum hydride, di-n-propyl aluminum hydride, di-n-butyl aluminum hydride, diisobutyl aluminum hydride, dihexyl aluminum hydride, di-isohexyl aluminum hydride, dioctyl aluminum hydride, di-iso-octyl aluminum hydride, ethyl aluminum dihydride, n-propyl aluminum dihydride, isobutyl aluminum dihydride. Among the organic compounds of aluminum listed above, triethyl aluminum, tri-isobutyl aluminum, diethyl aluminum hydride and di-isobutyl aluminum hydride, are preferred.

The quantities of components (a) to (d) and the relative ratios are selected according to the end use or necessity. In this respect, component (a) is preferably used in a quantity ranging from 0.0001 to 1.0 mmoles per 100 grams of conjugated diene to be polymerized. When the quantity is lower than 0.0001 mmoles, the reaction rate is reduced to unacceptable values, whereas when the quantity is higher than 1.0 mmoles, the concentration of the catalyst is too high and an elimination step of the ashes is therefore necessary. Component (a) is preferably used in a quantity ranging from 0.0005 to 1.0 mmoles.

Furthermore the molar ratio between component (a) and component (b) is 1/0.1–1/15, preferably 1/0.5–1/5.

As far as the quantity of component (c) is concerned, this can be expressed by referring to component (a). The above molar ratio (a)/(c) ranges from 1/1 to 1/5,000, preferably from 1/3 to 1/1,000. Furthermore, the molar ratio (a)/(d) ranges from 1/1 to 1/500, preferably from 1/10 to 1/300. The molar ratio (c)/(d) ranges from 1/0.02 to 1/300, preferably from 1/0.05 to 1/250. If the quantity of the components is outside the above ranges, the catalyst has a low activity or an elimination step of the ashes must be added.

In addition to components (a) to (d), a conjugated or non-conjugated diene can also be optionally used as catalytic component. Among conjugated dienes, the same conjugated diene subjected to polymerization can also be used, for example 1,3-butadiene and isoprene. Among the non-conjugated dienes, divinylbenzene, di-isopropenyl benzene, tri-isopropenyl benzene, 1,4-viylhexadiene, ethylidene norbornene, can be mentioned. The diene compound is not an essential catalytic component, however it can improve the catalytic activity if used together with components (a) to (d).

The catalytic system used in the process of the present invention is prepared, for example, by reacting components (a)–(d) dissolved in a suitable solvent or further reacted with the diene, according to any addition order. For improving the polymerization reactivity and reduction in the induction time, it is preferable for these components to be mixed, reacted and then aged. The aging temperature ranges from 0° C. to 100° C., preferably from 20 to 80° C. The duration of the aging is not binding, however its duration is at least 30 seconds.

The process of the present invention is carried out in the presence of the catalytic system described above in the presence of a hydrocarbon solvent.

Among the conjugated dienes which can be polymerized using the process of the present invention, the following can be mentioned: 1,3-butadiene, 2-methyl-1,3-butadiene (isoprene), 2,3-dimethyl-1,3-butadiene, 1,3-pentadiene, 1,3-hexadiene, cyclo 1,3-hexadiene. Among these the conjugated dienes which can be polymerized according to the process of the present invention are preferably selected from 1,3-butadiene and isoprene. The above conjugated dienes can be used alone or in a mixture of two or more. In these cases, i.e. using a mixture of two or more dienes, a copolymer is obtained.

As far as the polymerization solvent is concerned, this is selected from inert organic solvents such as saturated aliphatic hydrocarbons, for example butane, pentane, hexane, heptane; saturated alicyclic hydrocarbons, for example cyclopentane and cyclohexane; mono-olefins such as 1-butene and 2-butene; aromatic hydrocarbons, for example benzene, toluene, xylene; halogenated hydrocarbons, such as methylene chloride, chloroform, carbon tetrachloride, trichloro ethylene, perchloro ethylene, 1,2-dichloro ethane chloro benzene, bromo benzene, chloro toluene. In the preferred embodiment, the solvent is selected from saturated aliphatic hydrocarbons.

Furthermore, the concentration in the solvent of the diene monomer to be polymerized is normally within the range of 5–50%, preferably from 10% to 20% by weight.

In order to avoid the deactivation of the catalyst used in the process of the present invention, it is necessary to reduce as much as possible the incorporation of compounds having a deactivating action such as oxygen, water, carbon dioxide.

The process of the present invention can be carried out either in continuous or batchwise.

The polymer deriving from a conjugated diene obtained according to the process of the present invention has a content of 1,4-cis bond of at least 80%, a content of 1,2 unit of less than 2%, and a ratio between $M_w$ (weight average molecular weight) and $M_n$ (number average molecular weight) equal to or lower than 4.5, as measured via gel permeation chromatography.

In the preferred embodiment, the $M_w/M_n$ ratio is lower than or equal to 3.5. The average molecular weight ($M_w$), measured via GPC/MALLS normally ranges from $200 \cdot 10^3$ to $600 \cdot 10^3$, preferably from $300 \cdot 10^3$ to $500 \cdot 10^3$.

The catalyst can be prepared either directly in the reaction environment or preformed outside the reaction environment; it is preferably preformed outside.

The polymerization temperature must be selected so as to allow the development of cross-linking reactions between the polymeric chains which can take place either during or at the end of the polymerization itself. Under isothermal conditions, the temperature ranges from 70° C. to 140° C., preferably from 80° C. to 120° C.

Under adiabatic conditions, i.e. without the dispersion of heat, the initial polymerization temperature ranges from 50° C. to 90° C., preferably from 60° C. to 80° C. Under the above adiabatic conditions, the end temperature usually ranges from 100° C. to 150° C.

The reaction time is selected so as to allow the reactions which generate branched polymeric structures, to take place with a sufficient extension to obtain branching index values (measured with the GPC-MALLS technique) lower than 0.90 and α parameter values (also measured with the GPC-MALLS technique) ranging from 0.53 to 0.30. Depending on the polymerization conditions, the reaction time generally adopted ranges from 5 to 360', preferably from 30 to 180'.

The polymerization is stopped by introducing a stopping agent selected from those commonly used in the known art (i.e. EtOH, $H_2O$). The solvent is removed from the polymeric solution by means of flash and the resulting polymer is dried either in an oven or in an open mixer.

The polydienes obtained according to the process of the present invention can be used in the manufacturing of tyres. The presence of such a high branching degree, however, makes these products particularly suitable for application in the modification of plastic materials, in particular in the preparation of HIPS.

The following examples are provided for a better understanding of the present invention.

EXAMPLES

The following analytical tests are normally carried out on the polymer:

Mooney Viscosity, according to the method ASTM D 1646

Microstructure analysis (cis content), according to the internal method via I.R. spectroscopy.

Gel content analysis, according to the internal method which comprises the dissolution of the polymer in THF, the subsequent filtration on septa of 325 mesh and 0.2 micron, and the gravimetric evaluation of the insoluble product.

Absolute Viscosity, measured in a solution of styrene at 5% w/w at T=25° C.

Determination of the molecular mass distribution (MWD), according to the internal method via GPC in Tetrahydrofuran at T=25° C.

Determination of the average molecular weight and measurement of the branching by means of the GPC/MALLS technique By coupling a multi-angle light diffusion detector (MALLS) with a traditional SEC/RI elution system, it is possible to contemporaneously measure the absolute molecular weight and the radius of gyration of the macromolecules which are eluted from the chromatographic system; the quantity of light scattered from a macromolecular species in solution can in fact be used directly for obtaining its molecular weight, whereas the angular variation of the scattering is directly correlated with its average dimensions. The basic relation which is used is the following:

$$\frac{K^*c}{R_\theta} = \frac{1}{M_w P_\theta} + 2A_2 c \qquad 1)$$

wherein:

K*=optical constant, which depends on the wave-length of the light used, the dn/dc of the polymer, the solvent used $M_w$=weight average molecular weight c=concentration of the polymeric solution $R_\theta$=excess Rayleigh ratio (scattered light intensity measured at an angle θ).

$P_\theta$=function which describes the variation of the scattered light with the angle at which it is measured, equal to 1 for the angle θ equal to 0.

A2=second virial coefficient

For very low concentrations (typical of a GPC system), 1 is reduced to $$\frac{K^*c}{R_\theta} = \frac{1}{M_w P_\theta} \qquad 2)$$

and by effecting the measurement on different angles, the extrapolation at zero angle of the function $K^*c/R_\theta$ n relation to $sen^2\theta/2$ directly provides the molecular weight from the intercept value and the radius of gyration from the slope.

Furthermore, as this measurement is carried out for each slice of the chromatogram, it is possible to obtain a distribution of both the molecular weight and radius of gyration.

The macromolecular dimensions in solution are directly correlated to their branching degree: with the same molecular weight, the smaller the dimensions of the macromolecule with respect to the corresponding linear molecule, the higher the branching degree is; the information relating to the macrostructure of a polymer is deduced in two ways:

1. In a qualitative way, from the value of the α parameter, which represents the slope of the curve which correlates the radius of gyration with the molecular weight: when, under the same analysis conditions, this value decreases with respect to a macrostructure of the linear type, this indicates the presence of a polymer having a branched macrostructure; the typical value for polybutadiene with a high linear cis in THF is equal to 0.58–0.60.

2. In a quantitative way, by evaluating the branching index $g_M$, which is defined for each macromolecule, as a ratio between the average quadratic radius of gyration of the branched macromolecule with that of the linear macromolecule, with the same molecular weight:

$$g_{Mi} = \frac{<r^2>_b}{<r^2>_{l_{Mi}}} \quad 3)$$

The average branched index $g_M$ represents the average of this ratio along the distribution of the molecular masses, and ranges from 0 to 1.

Example 1

Preparation of the Catalyst (166/6)

1.2 ml of a solution of neodymium versatate in hexane having an Nd concentration of 0.458 M (0.549 mmoles) and 2.4 ml of a solution of acetylacetone in hexane having a concentration of 0.456 M (1.099 mmoles), are introduced by means of a syringe and at room temperature, into an anhydrous bottle, equipped with a magnetic anchor and capped with a crown top and rubber liner. After 10', 35.5 ml of a solution of MAO in toluene having a concentration of 1.55 M (55.03 mmoles) are added and again after a further period of 10':12.6 ml of a solution of DIBA in hexane having a concentration of 0.875 M (11.03 mmoles), 1.7 ml of a solution of DEAC in hexane having a concentration of 0.64 M (1.099 mmoles) and 6.8 ml of a solution of 1,3-butadiene in hexane having a concentration of 0.405 M (2.748 mmoles).

The mixture is left at room temperature for 30' and then used.

The Nd concentration of the solution proves to be: 0.00913 M (molar ratios in Table 1).

Comparative Example 2 (Linear Reference Polymer, Isotherm) (Test 140/78)

1161 g of anhydrous hexane and 189 g of 1,3-butadiene freshly distilled on a column filled with molecular sieves are added, in an atmosphere of $N_2$, to a 3 l Buechi-type steel reactor. The solvent-monomer mixture is brought to a temperature of 60° C. As soon as the temperature reaches the selected value, 6.2 ml of the catalytic solution according to Example 1 are added (0.0566 mmoles), and the stirring rate is brought to 200 rpm. The reaction temperature is maintained as close as possible to a value of 60° C. in order to have an isothermal profile. At the end of the polymerization, the catalyst is deactivated by introducing 20 ml of EtOH into the reactor; 12 ml of an ethanol solution at 10% of the pair of antioxidants TNPP and Irganox® 565, are subsequently added. The solvent is removed by stripping with vapour and the polymer is dried in an open mixer. The operating conditions for the preparation of the catalyst and polymerization are indicated in Table 1. The analytic results obtained on the rubber are specified in Table 2.

Example 3 (Branched Polymer, Isotherm) (167/13)

1188 g of anhydrous hexane and 162 g of 1,3 butadiene freshly distilled on a column filled with molecular sieves, are added, in an atmosphere of $N_2$, to a 3 l Buechi-type steel reactor. The solvent-monomer mixture is brought to a temperature of 90° C. (see Table 1). As soon as the temperature reaches the selected value, 10.6 ml of the catalytic solution according to Example 1 are added (0.0968 mmoles), and the stirring rate is brought to 200 rpm. The reaction temperature is maintained as close as possible to a value of 90° C. in order to have an almost isothermal profile. At the end of the polymerization, the same procedure is adopted as described in Example 2. The analytic results obtained on the rubber are specified in Table 2.

Comparative Example 4 (Linear Reference Polymer, Adiabatic) (167/11)

1175 g of anhydrous hexane and 176 g of 1,3 butadiene freshly distilled on a column filled with molecular sieves, are added, in an atmosphere of $N_2$, to a 3 l Buechi-type steel reactor. The solvent-monomer mixture is brought to a temperature of 40° C. As soon as the temperature reaches the selected value, 11.5 ml of the catalytic solution according to Example 1 are added (0.105 mmoles), and the stirring rate is brought to 200 rpm (Table 1). The reaction temperature rises, due to exothermy, to a value of 90° C. and is maintained at this value for the whole duration of the reaction. After 140', at the end of the polymerization, the same procedure is adopted as described in Example 2. The analytic results obtained on the rubber are specified in Table 2.

Example 5 (Branched Polymer, Adiabatic) (167/4)

1175 g of anhydrous hexane and 176 g of 1,3 butadiene freshly distilled on a column filled with molecular sieves, are added, in an atmosphere of $N_2$, to a 3 l Buechi-type steel reactor. The solvent-monomer mixture is brought to a temperature of 50° C. As soon as the temperature reaches the selected value, 11.5 ml of the catalytic solution according to Example 1 are added (0.105 mmoles), and the stirring rate is brought to 200 rpm (Table 1). The temperature of the mixture rises, due to exothermy, to a value of 100° C. and is maintained at this value for the whole duration of the reaction (140'). After 140', at the end of the polymerization, the same procedure is adopted as described in Example 2. The analytic results obtained on the rubber are specified in Table 2.

Example 6 (Preparation of the Catalyst 166/40)

The same procedure is adopted as described in Example 1, introducing into the bottle:
- 1.2 ml of a solution of neodymium versatate in hexane having an Nd concentration of 0.458 M (0.549 mmoles);
- 2.6 ml of a solution of acetylacetone in hexane having a concentration of 0.426 M (1.099 mmoles);
- 18.3 ml of a solution of MAO in toluene having a concentration of 1.5 M (27.48 mmoles);
- 13.3 ml of a solution of DIBA in hexane having a concentration of 0.827 M (10.99 mmoles);
- 4.7 ml of a solution of DEAC in hexane having a concentration of 0.943 M (4.40 mmoles);
- 4.4 ml of a solution of 1,3-butadiene in hexane having a concentration of 0.627 M (2.748 mmoles).

The mixture, as in Example 3, is left at room temperature for 30', and then used.

The Nd concentration of the solution proves to be: 0.0124 M (molar ratios in Table 3).

Example 7 (Branched Polymer, Adiabatic) (test 167/78)

1175 g of anhydrous hexane and 176 g of 1,3 butadiene freshly distilled on a column filled with molecular sieves, are added, in an atmosphere of $N_2$, to a 3 l Buechi-type steel reactor. The solvent-monomer mixture is brought to a temperature of 60° C. As soon as the temperature reaches the selected value, 7.1 ml of the catalytic solution according to Example 6 are added (0.080 mmoles), and the stirring rate is brought to 200 rpm (Table 3). The temperature of the mixture rises, due to exothermy, to a value of 115° C. and is maintained at this value for the whole duration of the reaction. After 130', at the end of the polymerization, the same procedure is adopted as described in Example 2. The analytic results obtained on the rubber are specified in Table 4.

Example 8 (Preparation of the Catalyst 166/52)

The same procedure is adopted as described in Example 1, introducing into the bottle:

1. 2 ml of a solution of neodymium versatate in hexane having an Nd concentration of 0.458 M (0.549 mmoles);
2. 6 ml of a solution of acetylacetone in hexane having a concentration of 0.426 M (1.099 mmoles);
3. 18.3 ml of a solution of MAO in toluene having a concentration of 1.5 M (27.48 mmoles);
4. 13.3 ml of a solution of DIBA in hexane having a concentration of 0.827 M (10.99 mmoles);
5. 2.3 ml of a solution of DEAC in hexane having a concentration of 0.943 M (2.198 mmoles);
6. 2.6 ml of a solution of 1,3-butadiene in hexane having a concentration of 1.065 M (2.75 mmoles).

The mixture is left at room temperature for 30', and then used. After use, it is stored, for the subsequent tests, in a refrigerator at −17° C.

The Nd concentration of the solution proves to be: 0.0136 M (molar ratios in Table 3).

Example 9 (Branched Polymer, Adiabatic) (test 167/86)

1175 g of anhydrous hexane and 176 g of 1,3 butadiene freshly distilled on a column filled with molecular sieves, are added, in an atmosphere of $N_2$, to a 3 l Buechi-type steel reactor. The solvent-monomer mixture is brought to a temperature of 80° C. As soon as the temperature reaches the selected value, 10.9 ml of the catalytic solution according to Example 8 are added (0.1482 mmoles), and the stirring rate is brought to 200 rpm (Table 3). The temperature of the mixture rises, due to exothermy, to a value of 125° C. and is maintained at this value for the whole duration of the reaction. After 120', at the end of the polymerization, the same procedure is adopted as described in Example 2. The analytic results obtained on the rubber are specified in Table 4.

TABLE 1

Operating conditions for the tests according to Examples 2, 3, 4, 5. Catalyst used: Example 1

| Ex. | Thermal profile | T (° C.) | MAO/Nd (mol) | DIBA/Nd (mol) | Cl/Nd (mol) | BD/Nd (mol) | [Nd] mmol/100 gr BD |
|---|---|---|---|---|---|---|---|
| Comp. 2 | Isothermal | 60 | 100 | 20 | 2 | 5 | 0.03 |
| 3 | " | 90 | " | " | " | " | 0.06 |
| Comp. 4 | Adiabatic | 40–90 | " | " | " | " | 0.06 |
| 5 | " | 50–100 | " | " | " | " | 0.06 |

N.B For the adiabatic tests, both the initial temperature and the value at the end of the reaction are indicated.

TABLE 2

Results of analyses on polydiene samples (ref. Table 1)

| Ex. | React. Time (min) | Conv. (%) | Macro gel (%) | Micro gel (%) | Mooney | MWD | Mw * 10$^{-3}$ Malls (g/mol) | α | $g_M$ | Cis % |
|---|---|---|---|---|---|---|---|---|---|---|
| comp. 2 | 150 | 86 | 1 | 3 | 55 | 4.0 | 430 | 0.56 | 0.94 | 95.7 |
| 3 | 140 | 100 | 2 | 4 | 58 | 2.5 | 410 | 0.44 | 0.80 | 89.6 |
| comp. 4 | 140 | 99 | <1 | 3 | 51 | 2.3 | 383 | 0.54 | 0.94 | 91.7 |
| 5 | 140 | 100 | 2 | 3 | 40 | 2.1 | 347 | 0.44 | 0.83 | 89.6 |

TABLE 3

Operating conditions for the tests with an adiabatic profile according to Examples 7, 9

| Ex. | T (° C.) | Catal. | MAO/Nd (mol) | DIBA/Nd (mol) | Cl/Nd (mol) | BD/Nd (mol) | [Nd] mmol/100 gr BD |
|---|---|---|---|---|---|---|---|
| 7 | 60–115 | Ex. 6 | 50 | 20 | 8 | 5 | 0.05 |
| 9 | 80–125 | Ex. 8 | " | " | 4 | " | 0.084 |

N.B. In all the tests the conversion is 100%

TABLE 4

Results of analyses on polydiene samples (ref. Table 3)

| Ex. | React. Time (min) | Macro gel (%) | Micro gel (%) | Mooney | Mw * 10<sup>-3</sup> Malls (g/mol) | α | $g_M$ | Cis % |
|---|---|---|---|---|---|---|---|---|
| 7 | 130 | 3 | 5 | 41 | 417 | 0.40 | 0.84 | 89.0 |
| 9 | 120 | <1 | 3 | 45 | 455 | 0.33 | 0.76 | 89.7 |

In the tests in a isothermal profile of Tables 1 and 2, it can be observed how at T=90° C. (Example 3), the polymerization reaction takes place so as to produce macromolecular structures characterized by branching index values $g_M$ equal to 0.80, whereas at T=60° C. (Comparative example 2), a polymer is obtained with a basically linear structure ($g_M$=0.94).

Also for the tests carried out according to a adiabatic thermal profile (Comparative example 4 and Example 5 of Tables 1–2), it can be seen how linear or branched polybutadienes can be obtained in relation to the temperature. The effect of the initial polymerization temperature in the adiabatic tests is clearly evident in Tables 3 and 4, which indicate examples of tests carried out starting from T=60÷80° C., much higher than the temperature of 40° C. of Comparative example 4. In these cases, as the temperatures at the end of the reaction are greater with respect, for example, to comparative test 4, there are significantly low branching index values $g_M$ (0.84 and 0.76) with α coefficient values (0.40 and 0.33), which demonstrate the presence of a significant long chain branching. In the tests of Tables 3 and 4, catalysts having a different Cl/Nd ratio value are also used to show how it is possible to obtain good results with respect to the branching also using different catalyst formulations.

TABLE 5

Application in the modification of plastic materials

| Ex. | Macro gel (%) | Micro gel (%) | Mooney | Mw * 10<sup>-3</sup> Malls (g/mol) | α | $g_M$ | Cis % | 1.2 % | Viscos. Sty. (cP) |
|---|---|---|---|---|---|---|---|---|---|
| 5 | 2 | 3 | 40 | 347 | 0.44 | 0.83 | 89.6 | 1.1 | 147 |
| 7 | 3 | 5 | 41 | 417 | 0.40 | 0.84 | 89.0 | 1.5 | 92 |
| 9 | <1 | 3 | 45 | 455 | 0.33 | 0.76 | 89.7 | 1.3 | 75 |

As for most of the polybutadienes prepared with catalysts based on rare-earth, the percentage content of 1,2 is much lower also for the polymers specified in the present invention (see Table 5): 1÷2%. It can therefore be seen how the rest of the double bonds is in a 1,4-trans configuration. This result, coupled with the presence of a significant branching degree, makes these polymers suitable for application in the modification of plastic materials (i.e. HIPS). It is widely known that, with the same molecular weight, branched macromolecules have lower viscosities—in a diluted solution—than linear macromolecules. This fact can be clearly observed in Table 5, where for some of the samples, considered as being most representative, the viscosities were measured in a solution of styrene at 5% wt. In some of the tests, viscosity values in solution lower than 100 cP were surprisingly obtained (Examples 7–9). This generally allows these polybutadienes to be used in a field such as the modification of HIPS, where polybutadienes prepared with catalysts based on cobalt are normally used.

The invention claimed is:

1. A process for the preparation of a polydiene which comprises the polymerization of a conjugated diene in the presence of a catalytic system which essentially consists in components (a) to (d), wherein:
   component (a): compound containing a rare-earth element having an atomic number from 57 to 71 in the Periodic Table, or a product obtained by reacting the above compound with a Lewis base;
   component (b): an organo aluminum derivative containing at least one halogen atom;
   component (c): an alumoxane;
   component (d): an organometallic compound of aluminum represented by general formula (I) $AlR_1R_2R_3$
   wherein $R_1$ and $R_2$, the same or different, are hydrocarbyl groups having from 1 to 10 carbon atoms or hydrogen, and $R_3$ is a hydrocarbyl group having from 1 to 10 carbon atoms; the above process being characterized in that it is effected under operating conditions selected from:
   (i) essentially isothermal conditions at a temperature ranging from 70° C. to 140° C.;
   (ii) essentially adiabatic conditions with an initial temperature ranging from 50° C. to 90° C. and a final temperature ranging from 100° C. to 150° C.;
   the above process being continued under conditions (i) or (ii) until a polydiene is obtained, having branching index values (measured with the GPC-MALLS technique) lower than 0.90 and α parameter values (also measured with the GPC-MALLS technique) ranging from 0.53 to 0.30.

2. The process according to claim 1, wherein the polymerization is effected under isothermal conditions (i) and is carried out at a temperature ranging from 80° C. to 120° C.

3. The process according to claim 1, wherein the polydiene is at least one selected from the group consisting of polybutadiene and polyisoprene.

4. The process according to claim 3, wherein the polybutadiene has a 1,2 content lower than 2%.

5. The process according to claim 1, wherein component (a) is a compound containing neodymium.

6. The process according to claim 1, wherein component (b) is an organo aluminum derivative containing at least one chlorine atom.

7. The process according to claim 1, wherein the molar ratio (a)/(b) ranges from 1/0.1 to 1/15, the molar ratio (a)/(c) ranges from 1/1 to 1/5,000, the molar ratio (a)/(d) ranges from 1/1 to 1/500, the molar ratio (c)/(d) ranges from 1/0.02 to 1/300.

8. The process according to claim 7, wherein the molar ratio between component (a) and component (b) ranges from 1/0.5 to 1/5,
   the molar ratio (a)/(c) ranges from 1/3 to 1/1,000,
   the molar ratio (a)/(d) ranges from 1/10 to 1/300,
   the molar ratio (c)/(d) ranges from 1/0.05 to 1/250.

9. The process according to claim 1, wherein component (a) is used in a quantity ranging from 0.0001 to 1.0 mmoles per 100 grams of conjugated diene to be polymerized.

10. The process according to claim 1, wherein the polymerization is effected under essentially adiabatic conditions (ii) with an initial temperature ranging from 50° C. to 90° C. and a final temperature ranging from 100° C. to 150° C.

* * * * *